(12) United States Patent
Green

(10) Patent No.: US 6,811,141 B2
(45) Date of Patent: Nov. 2, 2004

(54) VALVE INCLUDING VIBRATION DAMPENING MEANS

(75) Inventor: Chris Green, Toronto (CA)

(73) Assignee: Teleflex GFI Control Systems L.P., Kitchener (CA)

( * ) Notice: Subject to any disclaimer, the term of this patent is extended or adjusted under 35 U.S.C. 154(b) by 187 days.

(21) Appl. No.: 10/125,595

(22) Filed: Apr. 19, 2002

(65) Prior Publication Data

US 2003/0197140 A1 Oct. 23, 2003

(30) Foreign Application Priority Data

Jan. 28, 2002 (CA) .............................................. 2369640

(51) Int. Cl.⁷ .......................... F16K 1/00; F16K 25/00; F16K 31/122
(52) U.S. Cl. .................................... 251/324; 251/149.8
(58) Field of Search ............................. 251/142–149.9, 251/310–334

(56) References Cited

U.S. PATENT DOCUMENTS

| | | | |
|---|---|---|---|
| 4,215,715 A | * | 8/1980 | Raskin ........................ 251/333 |
| 4,506,860 A | | 3/1985 | von Schwerdtner et al. |
| 4,532,954 A | | 8/1985 | Fillman |
| 4,699,351 A | | 10/1987 | Wells |
| 4,930,539 A | | 6/1990 | van Rooy |
| 5,379,811 A | | 1/1995 | Dotson et al. |
| 5,676,346 A | * | 10/1997 | Leinsing .................. 251/149.1 |
| 5,979,869 A | * | 11/1999 | Hiddessen ................... 251/333 |
| 6,029,691 A | | 2/2000 | Tavor |
| 6,086,039 A | * | 7/2000 | Sievers et al. .............. 251/333 |
| 6,102,075 A | * | 8/2000 | Phillips ...................... 251/324 |
| 6,325,099 B1 | * | 12/2001 | Bunschoten et al. ...... 251/149.6 |

* cited by examiner

Primary Examiner—Paul J. Hirsch

(57) ABSTRACT

The present invention provides a valve comprising a conduit, characterized by a longitudinal axis, and a piston disposed within the conduit. The piston is characterized by a longitudinal axis and includes a pilot tip characterized by an operative surface configured to facilitate application of a net force transverse to the longitudinal axis of the piston by gaseous fluid flowing across the operative surface, and thereby bias or urge the piston in a radial or lateral direction relative to the longitudinal axis of the conduit. Fluid flowing across the operative surface is characterized by a flow field, and wherein the operative surface is configured to change the directional component of the flow field, such that the directional component of the flow field changes from a direction parallel to the longitudinal axis of the conduit to a direction which is angularly displaced from the longitudinal axis of the conduit. The piston is characterized by a longitudinal axis, and the operative surface is tapered or flared in a radially or laterally outward direction relative to the longitudinal axis of the piston. Further, the operative surface extends is disposed on the surface of the pilot tip, and is asymmetrically disposed about the longitudinal axis of the piston. The pilot tip further includes pilot guide members configured to limit radial or lateral movement of the pilot tip relative to the orifice.

4 Claims, 2 Drawing Sheets

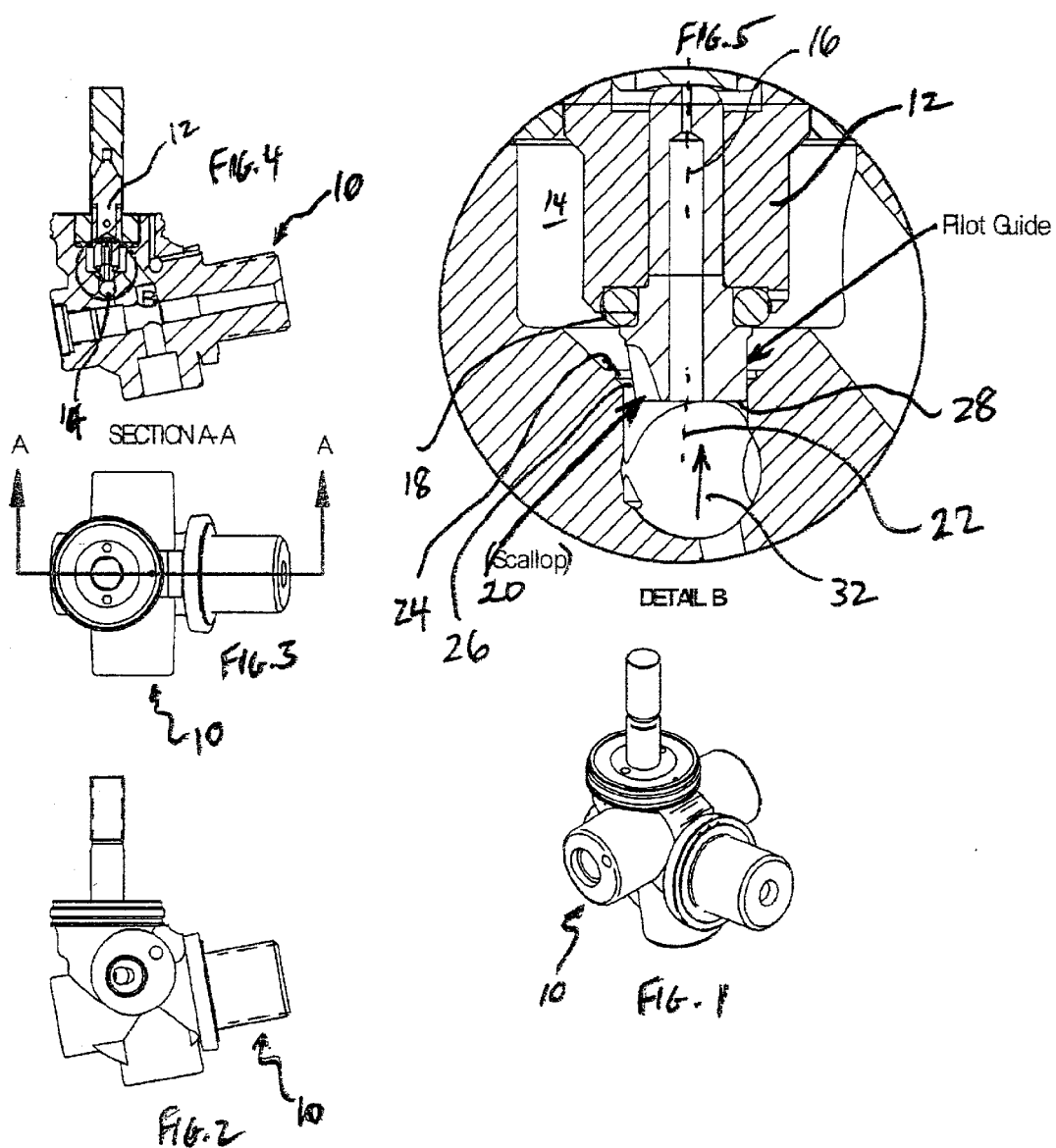

VALVE INCLUDING VIBRATION DAMPENING MEANS

FIELD OF INVENTION

The present invention relates to a tank valve, and more particularly a tank valve configured to mitigate vibrational movement.

BACKGROUND OF THE INVENTION

Valves are often designed to open upon the application of fluid forces. In this respect, the valve is urged into a seated position against the valve seat (for example, by a resilient member such as a compression spring), thereby closing the orifice. Once fluid pressure is sufficient to overcome the forces imparted by the resilient member, the valve becomes unseated and fluid begins to flow through the orifice.

Unfortunately, under some circumstances, fluid flowing through the orifice and past the valve imparts unbalanced pressure forces against the valve. Such unbalanced pressure forces tend to cause vibration of the valve, leading to premature wear and reduced service life.

SUMMARY OF THE INVENTION

The present invention provides a valve comprising a conduit characterized by a longitudinal axis, and a piston, disposed within the conduit, the piston being characterized by a longitudinal axis and including a pilot tip characterized by an operative surface configured to facilitate application of a net force transverse to the longitudinal axis of the piston by gaseous fluid flowing across the operative surface, and thereby bias or urge the piston in a radial or lateral direction relative to the longitudinal axis of the conduit.

In one aspect, the gaseous fluid flowing across the operative surface is characterized by a flow field, wherein the operative surface is configured to change the directional component of the flow field, such that the directional component of the flow field changes from a direction parallel to the longitudinal axis of the conduit to a direction which is angularly displaced from the longitudinal axis of the conduit.

In another aspect, the piston is characterized by a longitudinal axis, wherein the operative surface is tapered or flared in a radially or laterally outward direction relative to the longitudinal axis of the piston.

In a further aspect, the operative surface is disposed on the surface of the pilot tip.

In yet a further aspect, the pilot tip further includes pilot guide members configured to limit radial or lateral movement of the pilot tip relative to the orifice.

In yet another aspect, the operative surface is asymmetrically disposed about the longitudinal axis of the piston.

In yet a further aspect, the pilot tip includes a plurality of scallops presenting a corresponding plurality of a symmetrically tapered surface about the longitudinal axis of the piston.

In this respect, the conduit further includes a valve seat and an orifice disposed in the valve seat, the orifice including an orifice sidewall, and wherein the piston further includes a sealing surface configured to sealingly engage the valve seat to thereby close the orifice, and wherein the pilot tip further includes pilot guide members disposed between the scallops and closely spaced apart from a plane defined by the orifice sidewall.

In yet a further aspect, the pilot guide members are disposed on the surface of the pilot tip. In yet a further aspect, wherein the pilot guide members are configured to limit radial or lateral movement of the pilot tip relative to the orifice.

In yet a further aspect, the pilot tip is configured to extend through the orifice when the sealing surface is sealingly engaged to the valve seat.

The valve can be used to control flow of either gaseous or liquid fluids.

DESCRIPTION OF DRAWINGS

FIG. 1 is a perspective view of the valve of the present invention;

FIG. 2 is a side elevation view of the valve in FIG. 1;

FIG. 3 is a top plan view of the valve in FIG. 1;

FIG. 4 is a sectional side elevation view of the valve in FIG. 1;

FIG. 5 is a detailed view of Detail B illustrated in FIG. 4;

DETAILED DESCRIPTION

Figure 6:
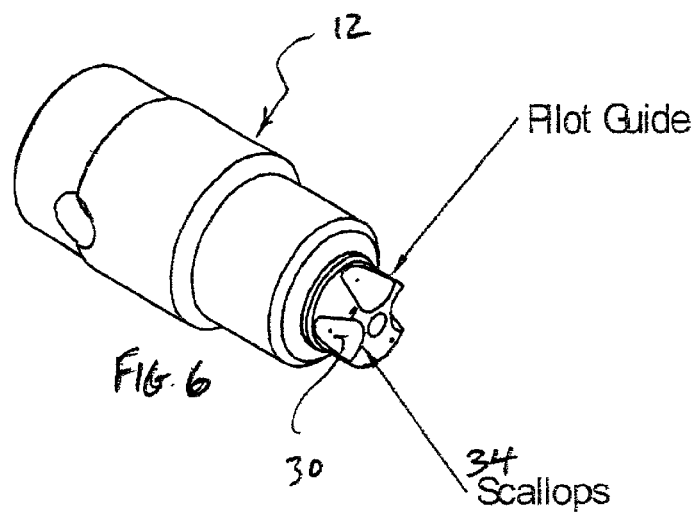
FIG. 6 is a perspective view of the valve piston of the valve in FIG. 1.

Referring to FIGS. 1–5, the present invention provides a valve 10, which is configured to mitigate vibrational movement urged by the flow of fluid past a valve piston 12. In one embodiment, the fluid is a gaseous fluid, such as pressurized natural gas or hydrogen. The fluid can also be liquid.

The valve 10 includes a piston 12 disposed within a conduit 14, and characterized by a longitudinal axis 16. The piston 12 includes a first end 48, a second end 50, a sealing surface 18, and a pilot tip 20.

The sealing surface 18 is disposed radially or laterally of the pilot tip 20, and intermediate the first and second ends 48, 50. The conduit 14 is characterized by a longitudinal axis 22 parallel or substantially parallel to the longitudinal axis 16 of the piston 12, and includes a valve seat 24 and an orifice 26 disposed within the valve seat 24. Axis 22 is substantially parallel to axis 16 where the piston 12 and conduit 14 are co-operatively configured such that the piston 12 is moveable relative to the conduit 14, even though axis 22 and axis 16 are not exactly parallel. In this respect, the valve seat 24 is disposed radially or laterally of the orifice 26 and is configured to seat the sealing surface 18.

The pilot tip 20 extends from the valve guide, and terminates at the second end 50. The pilot tip 20 includes a pilot guide 54 disposed on the surface of the pilot tip 20 and closely spaced apart from a plane defined by an orifice sidewall 56. The pilot guide 54 limits lateral movement of the pilot tip 20 relative to the orifice 26, such as that which may be caused by unbalanced forces derived from fluid flowing past the pilot tip 20.

The piston 12 is moveable relative to the valve seat 24, and is particularly moveable parallel or substantially parallel to the longitudinal axis 22 of the conduit 14. The piston 12 is characterized by a first position and a second position. In the first position, the sealing surface 18 of the piston 12 is sealingly engaged to the valve seat 24, and the pilot tip 20 extends through the orifice 26. The sealing surface 18 is configured to close the orifice 26 when sealingly engaged to the valve seat 24. As such, when the piston 12 is in the first position, the orifice 26 is closed. In the second position, the sealing surface 18 is spaced apart from the valve seat 24, and the orifice 26 is open to facilitate fluid flow therethrough. The pilot tip 20 still extends into the orifice 26 in the second position, but does not completely block the flow of gaseous fluid therethrough.

The pilot tip 20 further includes an operative surface 30 or deflector configured to facilitate application of a net force transverse to the longitudinal axis 16 of the piston 12 by fluid flowing across the operative surface 30. The action of the fluid flowing across the operative surface 30 biases or urges the piston 12 in a radial or lateral direction relative to the longitudinal axis 22 of the conduit 14. In this respect, the operative surface 30 is configured to change the directional component of the flow field, such that the directional component of the flow field changes from a direction parallel to the longitudinal axis 22 of the conduit 14 to a direction which is angularly displaced from the longitudinal axis 22 of the conduit 14. In one embodiment, the operative surface 30 or deflector is configured in this manner for the case where the fluid is flowing in a direction from the second end 28 and towards the first end, as indicated by directional arrow 32.

In one embodiment, the operative surface 30 of the pilot tip 20 is tapered or flared in a radially or laterally outward direction relative to the longitudinal axis 16 of the piston 12, and extends radially about the surface of the pilot tip 20. Further, the operative surface 30 is asymmetrically disposed about the longitudinal axis 16 of the piston 12.

Figure 7:
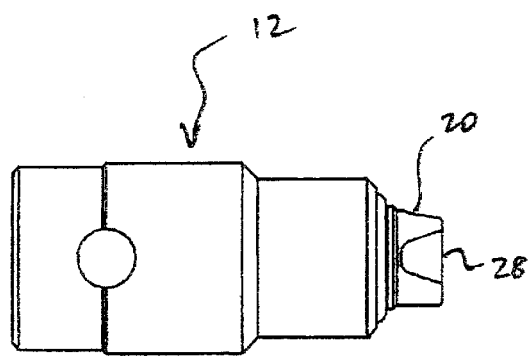
FIG. 7 is a side elevation view of the valve piston in FIG. 6.
Figure 8:
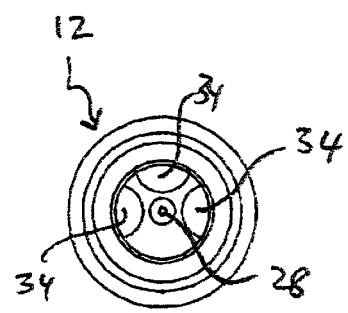
FIG. 8 is a bottom plan view of the valve piston in FIG. 6.

Referring to FIGS. 6–8, in one embodiment, a plurality of scallops (in this case three) 34, 36, 38 are formed in the pilot tip 20 of the piston 12. The three scallops 34, 36, 38 present asymmetrically tapered surfaces about the longitudinal axis 16 of the piston 12. The asymmetric configuration is important to facilitate application of a net force transverse to the longitudinal axis 16 of the piston 12 as gas flows past the piston 12. In this way, the piston 12 is biassed in a direction transverse to the longitudinal axis 22 of the conduit 14 and is, therefore, less prone to vibrations caused by unbalanced fluid forces generated by fluid flowing past the piston 12. Pilot guide members 40, 42, 44 are respectively disposed between scallops 34 and 36, 36 and 38, and 38 and 34. Further, the pilot guide members 40, 42, 44 are disposed on the surface of the pilot tip 20 at the periphery of the pilot tip 20 and closely spaced apart from a plane defined by the orifice sidewall 56. The pilot guide members 40, 42, 44 further limit lateral movement of the pilot tip relative to the orifice 26, such as that which would be caused by unbalanced forces derived from fluid flowing past the pilot tip 20. In combination with the orifice sidewall 56, each of pilot guide members 40, 42, 44 limits such lateral movement.

In one embodiment, and as more clearly illustrated in FIG. 4, the valve 10 is a two-stage valve mounted to the nozzle of a pressure vessel. The valve is urged to seal the orifice 26 by a resilient member 48, such as a compression spring. The two-stage valve is actuated to become unseated relative to the valve seat 24 by a solenoid coil housed in the body of the valve 10, thereby facilitating flow through the orifice 26 from a passage 46.

Although the disclosure describes and illustrates preferred embodiments of the invention, it is to be understood that the invention is not limited to these particular embodiments. Many variations and modifications will now occur to those skilled in the art. For definition of the invention, reference is to be made to the appended claims.

What is claimed is:

1. A valve for controlling flow of a fluid therethrough, the valve comprising:
    a conduit having an internal surface;
    a piston disposed at least partially within the conduit, the piston having a longitudinal axis and including a pilot tip at an upstream end of the piston;
    the piston being movable between a first position, in which the piston is seated on a valve seat, thereby preventing flow of the fluid through the valve, and a second position, in which the piston is spaced apart from the valve seat to permit flow of the fluid through the valve; and
    the pilot tip having at least one operative surface configured for engagement with fluid flowing through the valve such that the fluid urges the piston transversely relative to the longitudinal axis upon movement of the piston between the first position and the second position, causing the piston to engage a part of the conduit's internal surface.

2. A valve as claimed in claim 1 in which said at least one operative surface is positioned asymmetrically relative to the longitudinal axis of the piston, for causing the piston to be urged in a transverse direction relative to the longitudinal axis by fluid flowing through the valve upon movement of the piston between the first position and the second position.

3. A valve as claimed in claim 1 in which the pilot tip additionally includes at least one pilot guide members extending radially beyond said at least one operative surface for engaging the conduit internal surface to limit radial movement of the pilot tip relative to the longitudinal axis of the piston.

4. A valve as claimed in claim 1 in which the pilot tip includes a plurality of curved operative surfaces positioned asymmetrically relative to the longitudinal axis of the piston.

* * * * *